Figure 1:
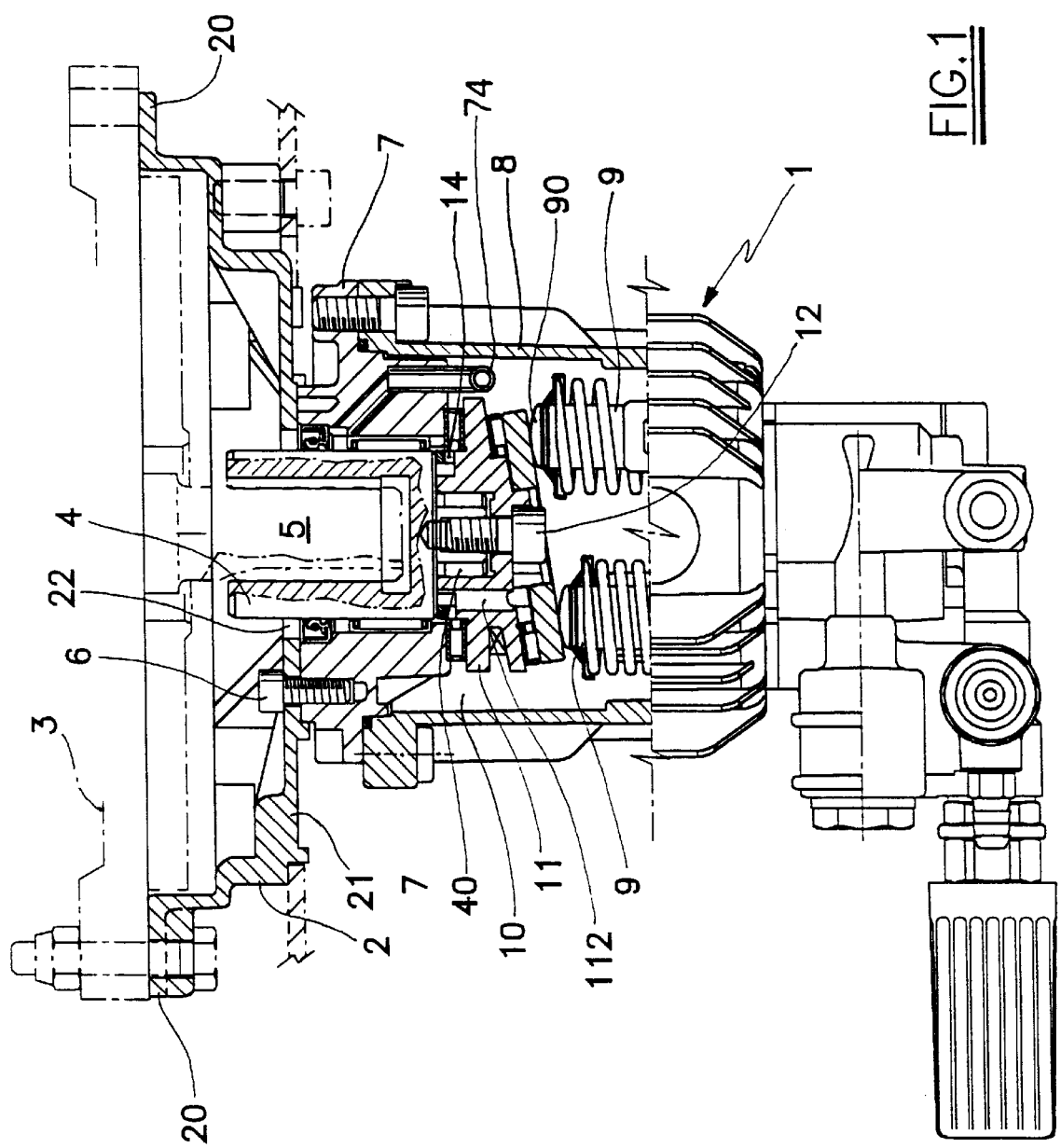

United States Patent
Magri et al.

[11] Patent Number: 6,112,641
[45] Date of Patent: Sep. 5, 2000

[54] LUBRICATION SYSTEM FOR HIGH-PRESSURE LIQUID PUMPS WITH CYLINDERS OF VERTICAL AXIS

[75] Inventors: Maurizio Magri; Fabrizio Fabbri, both of Modena, Italy

[73] Assignee: Annovi Reverberi, S.p.A., Modena, Italy

[21] Appl. No.: 09/098,532

[22] Filed: Jun. 17, 1998

[30] Foreign Application Priority Data

Jul. 9, 1997 [IT] Italy ................... RE97A0049

[51] Int. Cl.[7] ........................... F01B 31/10
[52] U.S. Cl. .......................... 92/154; 184/11.2
[58] Field of Search ............... 92/153, 154, 71; 91/499; 417/269, 366; 184/11.1, 11.2, 13.1, 6.17

[56] References Cited

U.S. PATENT DOCUMENTS

| | | |
|---|---|---|
| 3,209,701 | 10/1965 | Phinney . |
| 3,318,644 | 5/1967 | Johnson . |
| 4,005,948 | 2/1977 | Hiraga et al. . |
| 4,700,808 | 10/1987 | Haentjens . |
| 5,370,505 | 12/1994 | Takenaka et al. .................. 417/269 |
| 5,934,887 | 9/1999 | Veit .................................. 417/417 |

FOREIGN PATENT DOCUMENTS

| | | |
|---|---|---|
| 0780573 A2 | 6/1997 | European Pat. Off. . |
| 531414 | 8/1931 | Germany . |

*Primary Examiner*—Edward K. Look
*Assistant Examiner*—Thomas E. Lazo
*Attorney, Agent, or Firm*—Birch, Stewart, Kolasch & Birch

[57] ABSTRACT

High pressure pump, particularly for water, containing a sealed chamber containing, partially in an oil bath, an inclined disc keyed onto the shank of a socket bush arranged to receive a drive shaft, the bush being received in a hole in the base of the chamber by way of a roller cage and a lip gasket, the inclined disc engaging the ends of pumping pistons to operate them with reciprocating motion, within the chamber base there being provided at least one conduit which connects a region in proximity with the lateral wall of the chamber to the bush-receiving hole within the space between the roller cage and the lip gasket.

4 Claims, 2 Drawing Sheets

LUBRICATION SYSTEM FOR HIGH-PRESSURE LIQUID PUMPS WITH CYLINDERS OF VERTICAL AXIS

This patent relates to high-pressure pumps, particularly for water, and in particular to methods for lubricating the rotating and reciprocating masses present in them.

High-pressure pumps are known, comprising within the pump body a sealed chamber which encloses the members required for the pump operation.

Specifically the chamber interior contains the end part of a rotary shaft mounted on a supporting bearing and provided for transmitting movement to a plate which is keyed onto said shaft by known means, and rests on the base of said chamber via a thrust bearing.

This plate has a working surface inclined to its axis of rotation and interfering with the end of the pressurized liquid delivery and intake pistons, to impress reciprocating movement on them. It is provided specifically to generate the outward stroke of said pistons, their return stroke being determined by suitable counteracting springs.

The rotary and reciprocating masses of this type of pump are lubricated by partially filling the sealed chamber of the pump body with lubricating oil.

High-pressure pumps of the described type can operate either in a horizontal or in a vertical position, depending on the type of motor to which they are connected.

In particular, such pumps are operated in a horizontal position when connected to an internal combustion engine with a horizontal shaft, whereas they are operated in a vertical position when connected to an internal combustion engine with a vertical shaft.

This latter arrangement is more advantageous from the economy viewpoint as internal combustion engines with vertical shafts are more widespread and are of lower cost.

If pumps of the aforesaid type are operated in the horizontal position, ie connected to an internal combustion engine within a horizontal shaft, lubrication of the rotary and reciprocating masses takes place correctly, by oil splashing.

However if the pump is operated in a vertical position insufficient lubrication of the rotary masses occurs, in particular of the drive shaft support bearing and of the thrust bearing on which said plate rests, as the oil level is at about one half of the chamber containing these members, and does not reach the upper levels by splashing.

This results in premature wear of said members and hence of the pump.

The object of the invention is to lubricate said members in such a manner as to eliminate said drawbacks in high-pressure pumps of the aforesaid type when operating by connection to internal combustion engines with a vertical shaft.

This object is attained according to the invention by providing at least one communication conduit having one end positioned in proximity to the bearing of the drive shaft.

During pump operation said masses entrain the oil contained in said chamber so that by centrifugal force it becomes thrust against the lateral walls of the chamber. In this manner a pressure is created enabling the oil to rise within the conduit.

The invention attains this and other objects by virtue of the characteristics defined in the claims.

The constructional and functional characteristics of the invention will be more apparent from the ensuing description of a preferred embodiment thereof, given by way of non-limiting example and illustrated on the accompanying drawings.

Figure 2:
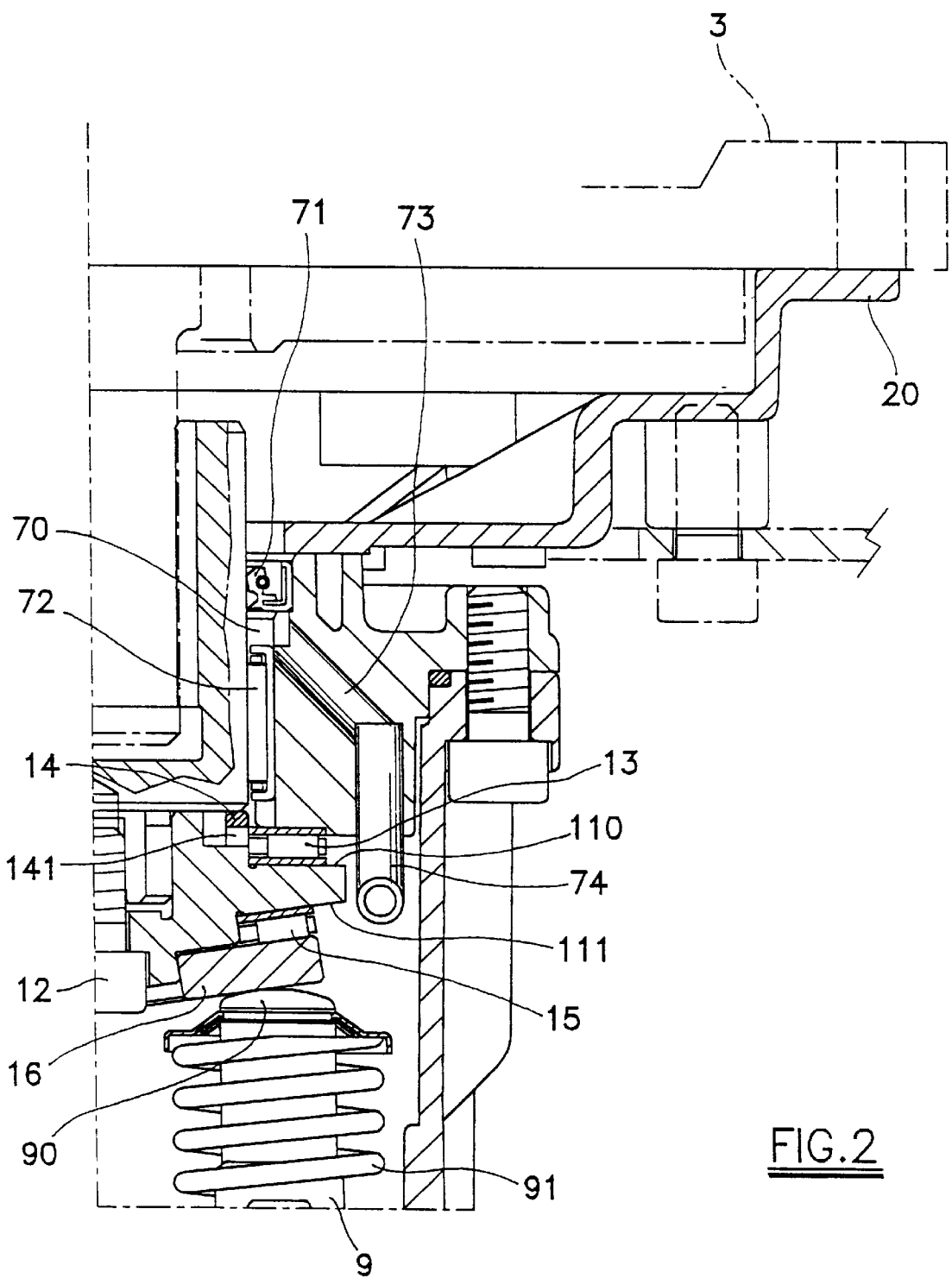

FIG. 1 is a partially sectional view of the invention.
FIG. 2 is an enlargement of a part of FIG. 1.

Said figures show a pump 1, to the top of which a cap-shaped body 2 is connected.

The cap-shaped body 2 comprises an upper flange 20 for fixing to the motor 3 and contains in its base 21 a central seat 22 for the passage of a socket bush 4 provided with a shank 40 and keyed by known means onto the shaft 5 of the motor 3.

The base 21 of the cup-shaped body 2 also comprises passage seats for screws 6 for fixing the profiled base 7 of the pump 1.

The profiled base 7 is provided with a through central hole 70 arranged to receive the socket bush 4. Between the socket bush 4 and the internal walls of the hole 70 there are positioned a seal gasket 71 and a roller cage 72 for supporting the socket bush 4.

In addition the profiled base 7 comprises a conduit 73 connecting the lower surface of the profiled base 7 to the inner surface of the central hole 70. Into the hole present in the lower surface of the profiled base 7 there is inserted, as shown in the figure, an elbow tube 74 the end of which is orientated in the opposite direction to the direction of rotation of the shaft 5.

The opening of the conduit 73 in the lateral wall of the hole 70 is located between the seal gasket 71 and the underlying roller cage 72. The purpose of the conduit 73 will be apparent hereinafter.

On the profiled base 7 there is mounted the profiled body 8, the lower part of which, not shown, comprises three cylinders, of which the axes are positioned at the vertices of an equilateral triangle, and which are arranged to receive three equal pistons 9.

The profiled base 7 and the profiled body 8 define a sealed chamber 10, which receives the operating members of said pump 1 and is partially filled with lubricating oil.

Specifically, the sealed chamber 10 contains a disc 11 having a central hole for receiving the shank 40, on which it is fixed by the screw 12.

The disc 11 has an upper bearing surface 110 perpendicular to its axis of rotation and a lower working surface 111 inclined to said axis.

The surface 110 rests against the lower end of the thrust bearing 13, the upper end of which rests against the lower flat surface of the profiled base 7.

In its top the disc 11 comprises an annular cavity for receiving a ring 14 provided with apertures 141 and having its upper surface resting against the base of the socket bush 4. The purpose of the ring 14 will be apparent hereinafter.

The disc 11 is also provided with a conduit 112 which connects the apertures 141 of the ring 14 to the sealed chamber 10.

The inclined working surface 111 is provided with two steps, the first of which receives a usual roller cage 15, the second receiving a ring 16 the upper surface of which rests against said roller cage 15 and the lower surface of which interferes with the heads 90 of the pistons 9.

During the operation of the pump 1, the disc 11 rotates rigid with the shaft 5, to cause the ring 16 to oscillate so that it impresses reciprocating motion on the pistons 9.

In this respect, the ring 16 causes the pistons 9 to undergo their outward stroke, their return stroke being determined by the springs 91.

During its rotation, the disc 11 transmits rotary movement to the lubricant contained in the sealed chamber 10, so that being subjected to centrifugal force it tends to position itself along the lateral walls of said sealed chamber 10 by rotating in the direction of rotation of the disc 11.

The speed impressed on the lubricant fluid is such as to cause it to rise along the tube 74 and the conduit 73, together with the oil vapour generated by the heating undergone by the lubricating oil by virtue of the friction which it encounters in rotating against the lateral walls of the sealed chamber 10 and more generally against the members present in said chamber. This oil vapour is discharged from the gasket 71 which is of lip type and is such as to enable said vapour to emerge, being mounted inverted compared with traditional mounting.

The oil emerging from the conduit 73 lubricates the underlying roller cage 72 supporting the bush 4, and by virtue of the presence of the disc 14 provided with radial conduits it descends to also lubricate the thrust bearing 13 and then fall into the chamber 10. However, a part of the oil flows through the conduit 112 and lubricates the roller cage 15.

In this manner effective and sufficient lubrication of the rotary members provided within the sealed chamber 10 for operating the pump is achieved.

What is claimed is:

1. A high-pressure pump, particularly for water, comprising a sealed chamber containing, partially in an oil bath, an inclined disc keyed onto the shank of a socket bush arranged to receive a drive shaft, said bush being received in a hole in the base of said chamber by way of a roller cage and a lip gasket, said inclined disc engaging the ends of pumping pistons to operate them with reciprocating motion, characterized in that within the chamber base there is provided at least one conduit which connects a region in proximity with the lateral wall of the chamber to said bush-receiving hole within the space between said roller cage and said lip gasket; and wherein into the conduit there is inserted a tube which extends into the chamber.

2. A pump as claimed in claim 1, wherein the end of said tube which extends into the chamber is bent at 90° in the opposite direction to the direction of rotation of the inclined disc.

3. A high-pressure pump, particularly for water, comprising a sealed chamber containing, partially in an oil bath, an inclined disc keyed onto the shank of a socket bush arranged to receive a drive shaft, said bush being received in a hole in the base of said chamber by way of a roller cage and a lip gasket, said inclined disc engaging the ends of pumping pistons to operate them with reciprocating motion, characterized in that within the chamber base there is provided at least one conduit which connects a region in proximity with the lateral wall of the chamber to said bush-receiving hole within the space between said roller cage and said lip gasket; and wherein the inclined disc rests against the base of the socket bush by way of a ring provided with apertures which connect the bush-receiving hole to the chamber interior.

4. A high-pressure pump, particularly for water, comprising a sealed chamber containing, partially in an oil bath, an inclined disc keyed onto the shank of a socket bush arranged to receive a drive shaft, said bush being received in a hole in the base of said chamber by way of a roller cage and a lip gasket, said inclined disc engaging the ends of pumping pistons to operate them with reciprocating motion, characterized in that within the chamber base there is provided at least one conduit which connects a region in proximity with the lateral wall of the chamber to said bush-receiving hole within the space between said roller cage and said lip gasket; and wherein the inclined disc is provided with a through hole parallel to its axis.

\* \* \* \* \*